(12) United States Patent
Butler-Ammar

(10) Patent No.: US 8,776,387 B1
(45) Date of Patent: Jul. 15, 2014

(54) BOTTLE NIPPLE SIZE SELECTION SYSTEM

(71) Applicant: Travina Butler-Ammar, Pacific Grove, CA (US)

(72) Inventor: Travina Butler-Ammar, Pacific Grove, CA (US)

( * ) Notice: Subject to any disclaimer, the term of this patent is extended or adjusted under 35 U.S.C. 154(b) by 172 days.

(21) Appl. No.: 13/621,875

(22) Filed: Sep. 18, 2012

(51) Int. Cl.
*A61B 5/107* (2006.01)
*G01B 3/34* (2006.01)

(52) U.S. Cl.
USPC .................................. 33/512; 33/555.2

(58) Field of Classification Search
USPC .................. 33/512, 550, 555.1, 555.2, 555.3, 33/555.4, 563
See application file for complete search history.

(56) References Cited

U.S. PATENT DOCUMENTS

| | | | | |
|---|---|---|---|---|
| 1,212,279 A * | 1/1917 | Stone | | 33/555.2 |
| 2,728,145 A * | 12/1955 | Holladay | | 33/555.2 |
| 3,858,325 A * | 1/1975 | Goerler | | 33/555.2 |
| 4,517,747 A * | 5/1985 | Morin | | 33/512 |
| 5,108,686 A | 4/1992 | Griffin | | |
| 5,170,570 A * | 12/1992 | Mays, Jr. | | 33/512 |
| 5,251,642 A * | 10/1993 | Handlos | | 600/587 |
| 5,353,513 A * | 10/1994 | Round | | 33/555.2 |
| 5,653,732 A | 8/1997 | Sheehy | | |
| 5,741,212 A * | 4/1998 | Matthews | | 33/512 |
| 5,814,098 A * | 9/1998 | Hinnenkamp et al. | | 33/512 |
| 6,981,988 B1 * | 1/2006 | Kinsley | | 33/512 |
| 6,996,913 B2 * | 2/2006 | Lum et al. | | 33/550 |
| 7,311,106 B1 | 12/2007 | Burton | | |
| 7,335,183 B2 | 2/2008 | Buiatti | | |
| 7,685,721 B2 * | 3/2010 | Adams et al. | | 33/512 |
| 2003/0131489 A1 * | 7/2003 | Hsiao | | 33/555.2 |
| 2006/0136069 A1 * | 6/2006 | Francalacci Franca | | 33/512 |
| 2007/0131637 A1 | 6/2007 | Tamura | | |
| 2008/0314776 A1 | 12/2008 | Cooke | | |
| 2010/0288833 A1 * | 11/2010 | Santos et al. | | 33/555.2 |

\* cited by examiner

*Primary Examiner* — G. Bradley Bennett
(74) *Attorney, Agent, or Firm* — Jason L. Gilbert

(57) ABSTRACT

A bottle nipple size selection system for more accurately matching a bottle nipple to the individual anatomy of the mother. The bottle nipple size selection system generally includes a flat, rectangular member having a plurality of sizing apertures extending from its first end to its second end. Each of the apertures has a different diameter, wherein each of the aperture sizes are generally offset by at least 4 mm. By utilizing the apertures on the template, the mother may more accurately locate a bottle nipple which will match the size and contour of the mother's nipple to prevent the mother's baby from refusing breastfeeding due to becoming accustomed to a differently-sized bottle nipple.

20 Claims, 3 Drawing Sheets

BOTTLE NIPPLE SIZE SELECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a bottle nipple size selector and more specifically it relates to a bottle nipple size selection system for more accurately matching a bottle nipple to the individual anatomy of the mother.

2. Description of the Related Art

Any discussion of the related art throughout the specification should in no way be considered as an admission that such related art is widely known or forms part of common general knowledge in the field.

In modern times, women are more often working outside jobs after giving birth to a child. In such circumstances, the mother is not always around to breastfeed the child. While options for formula exist, many mothers prefer to breastfeed their children for cultural reasons or to build an additional bond with the newborn.

When such women are required to leave the baby for long periods of time (such as for work), bottles with artificial nipples are typically used to feed the baby with breastmilk which has been pumped from the mother. In the past, bottle nipples have been selected merely based on the age of the baby. However, it is well-known that breastfed infants can become accustomed to the bottle's nipple and thus develop a preference to its size, shape and flow which can interfere with normal breastfeeding when the mother is present.

Because of the inherent problems with the related art, there is a need for a new and improved bottle nipple size selection system for more accurately matching a bottle nipple to the individual anatomy of the mother.

BRIEF SUMMARY OF THE INVENTION

The invention generally relates to a bottle nipple selection system which includes a sizing template comprised of a flat, rectangular member having a plurality of sizing apertures extending from its first end to its second end. Each of the apertures has a different diameter, wherein each of the aperture sizes are generally offset by at least 4 mm. By utilizing the apertures on the template, the mother may more accurately locate a bottle nipple which will match the size and contour of the mother's nipple to prevent the mother's baby from refusing breastfeeding due to becoming accustomed to a differently-sized bottle nipple.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
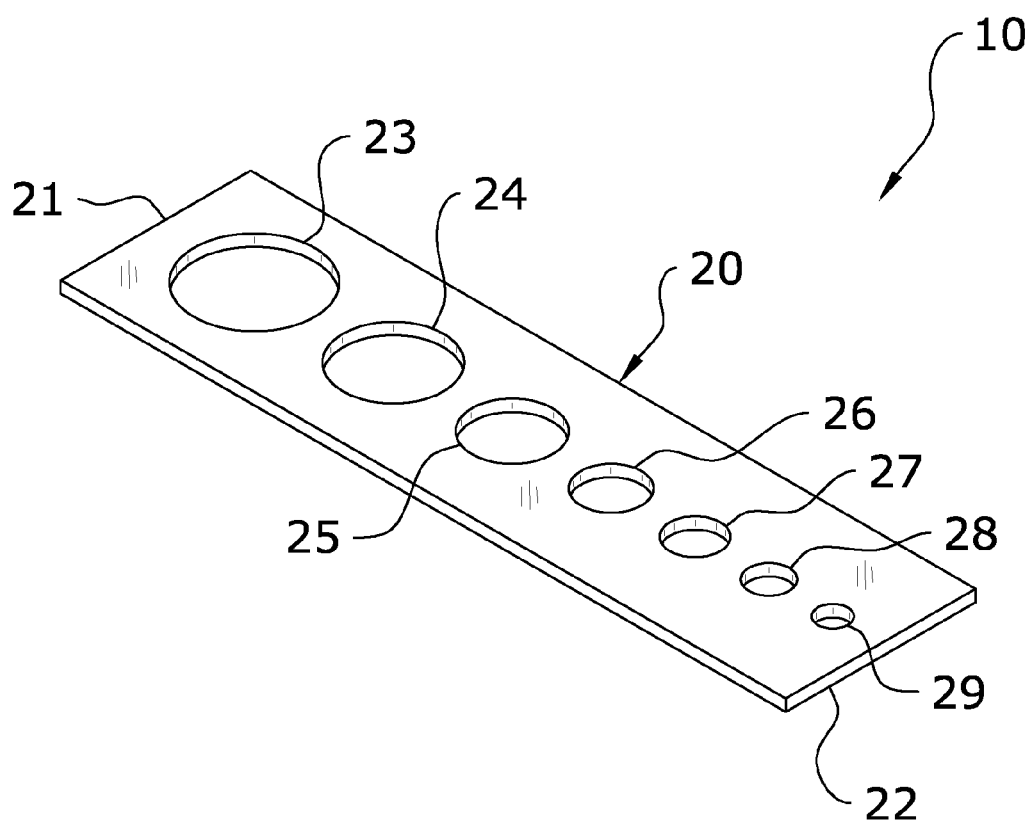
FIG. 1 is an upper perspective view of the present invention.
Figure 1:
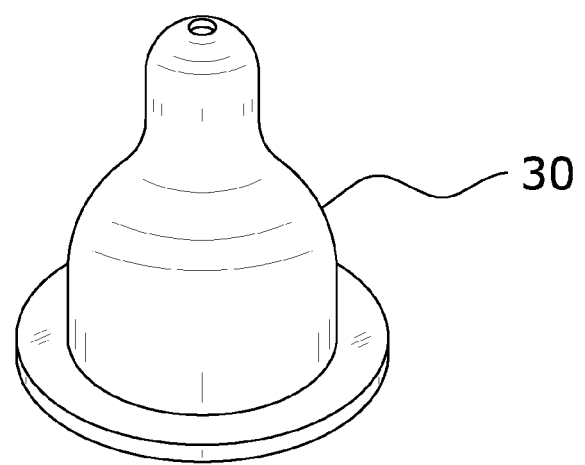

Turning now descriptively to the drawings, in which similar reference characters denote similar elements throughout the several views, FIGS. 1 through 4 illustrate a bottle nipple size selection system 10, which comprises a sizing template 20 comprised of a flat, rectangular member having a plurality of sizing apertures 23, 24, 25, 26, 27, 28, 29 extending from its first end 21 to its second end 22. Each of the apertures 23, 24, 25, 26, 27, 28, 29 has a different diameter, wherein each of the aperture 23, 24, 25, 26, 27, 28, 29 sizes are generally offset by at least 4 mm. By utilizing the apertures 23, 24, 25, 26, 27, 28, 29 on the template 20, the mother may more accurately locate a bottle nipple 30 which will match the size and contour of the mother's nipple 12 to prevent the mother's baby from refusing breastfeeding due to becoming accustomed to a differently-sized bottle nipple 30.

B. Sizing Template

As best shown in FIG. 1, the present invention generally includes a sizing template 20 which is utilized to ensure that the bottle nipple 30 selected by the mother most accurately matches the shape and contour of the mother's nipple 12. It is appreciated that the sizing template 20 shown in the figures is merely exemplary; multiple different embodiments may be utilized which may not necessarily share an appearance with the exemplary figures included herein. Thus, the scope of the present invention should not be construed as being limited by the exemplary figures.

The sizing template 20 is generally comprised of a flat, rectangular member having a first side 21 and a second side 22. The sizing template 20 is preferably thin enough such that a mother's nipple 12 may pass completely through one or more of the sizing apertures 23, 24, 25, 26, 27, 28, 29. While the figures illustrate a rectangular sizing template 20, it is appreciated that other shapes and configurations may be utilized. For example, the sizing template 20 could be comprised of a square-shape, circular-shape, triangular-shape and the like. The sizing template 20 may be comprised of various materials, but will preferably be comprised of a material which will not injure or chafe the mother's skin.

The sizing template 20 is utilized to accurately select a size for the bottle nipple 30 which will most closely resemble the mother's own nipple 12. Thus, the sizing template 20 includes a plurality of sizing apertures 23, 24, 25, 26, 27, 28, 29 extending along its length from its first side 21 to its second side 22 as shown in FIG. 1. Each of the sizing apertures 23, 24, 25, 26, 27, 28, 29 is comprised of a different size for matching the size and contour of a mother's nipple 12.

The figures illustrate a sizing template 20 having seven apertures 23, 24, 25, 26, 27, 28, 29 extending along its length from its first end 21 to its second end 22. It is appreciated that this is a preferred embodiment, and various other numbering of apertures 23, 24, 25, 26, 27, 28, 29, spacing of apertures 23, 24, 25, 26, 27, 28, 29 and positioning of apertures 23, 24, 25, 26, 27, 28, 29 may be utilized.

The apertures 23, 24, 25, 26, 27, 28, 29 will preferably range in size from smallest to largest from the first side 21 of the template 20 to its second side 22. In a preferred embodiment as shown in the figures, a first aperture 23 will have a diameter of 9.525 mm, a second aperture 24 will have a diameter of 12.7 mm, a third aperture 25 will have a diameter of 15.875 mm, a fourth aperture 26 will have a diameter of 19.05 mm, a fifth aperture 27 will have a diameter of 25.4 mm, a sixth aperture 28 will have a diameter of 31.75 mm and a seventh aperture 29 will have a diameter of 38.1 mm. By increasing the diameter by approximately 4 mm between sizes, an accurate fit can typically found.

C. Operation of Preferred Embodiment

Figure 2:
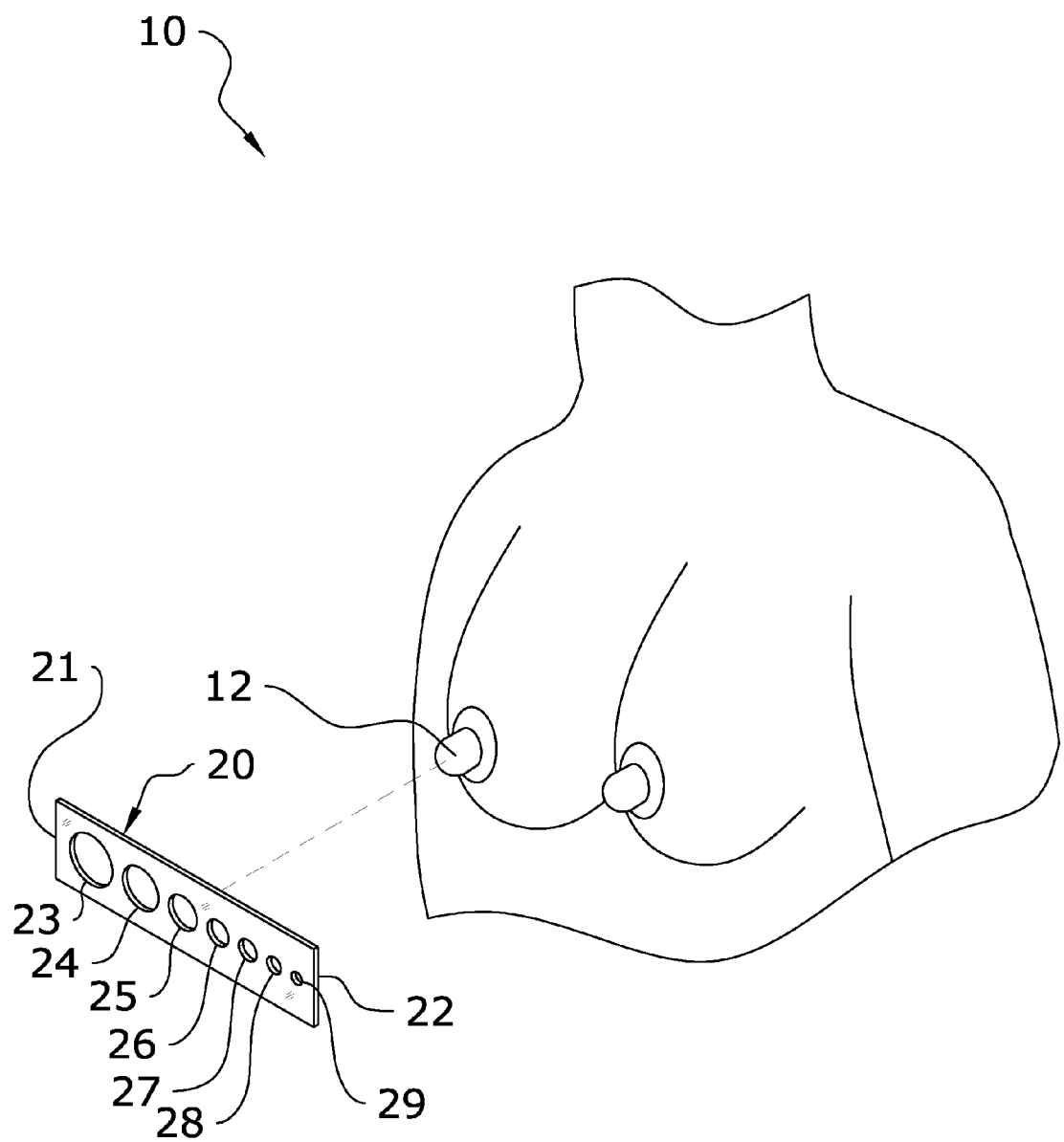
FIG. 2 is an upper perspective view illustrating usage of the present invention.
Figure 3:
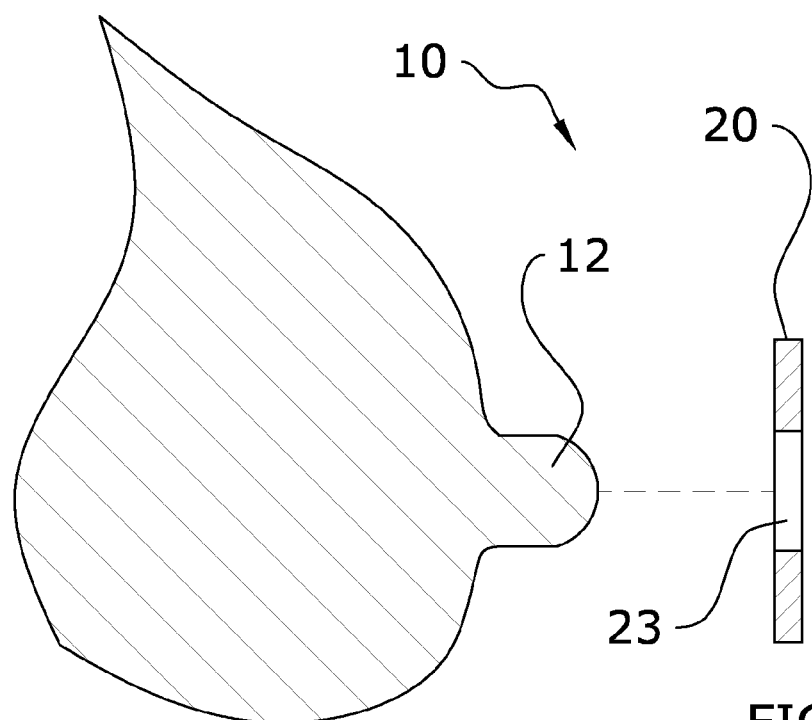
FIG. 3 is a side cutaway view illustrating the alignment of the sizing template with a mother's nipple.
Figure 4:
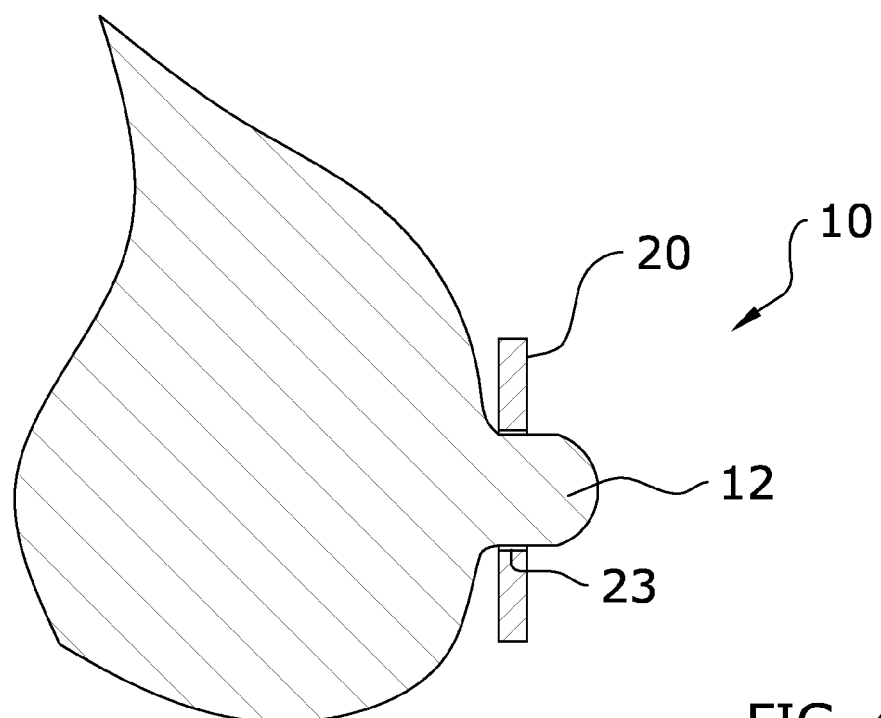
FIG. 4 is a side cutaway view of the sizing template positioned over a mother's nipple.

In use, a mother will first utilize the template 20 to select a proper bottle nipple 30 size. As shown in FIG. 2, the mother will align one of the apertures 23, 24, 25, 26, 27, 28, 29 with her nipple 12 one-by-one until a proper fit is found. FIGS. 3 and 4 illustrate the exact positioning of the apertures 23, 24, 25, 26, 27, 28, 29 over the mother's nipple 12.

After finding the proper size, the mother may obtain a bottle nipple 30 which more accurately resembles her own nipple 12. Thus, the mother's baby will have less chance of refusing the mother's nipple 12 after becoming accustomed to bottle feeding 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A bottle nipple size selection system, comprising:
a sizing template, wherein said sizing template is comprised of a flat member;
a plurality of apertures extending along a length of said sizing template, wherein each of said plurality of apertures is comprised of a different diameter; and
a plurality of bottle nipples, wherein each of said plurality of bottle nipples matches a width of one of said plurality of apertures.

2. The bottle nipple size selection system of claim 1, wherein said sizing template is rectangular.

3. The bottle nipple size selection system of claim 1, wherein said sizing template is comprised of a first end and a second end, wherein said plurality of apertures are oriented in a straight line from said first end to said second end.

4. The bottle nipple size selection system of claim 1, wherein said plurality of apertures is comprised of a first aperture, a second aperture and a third aperture.

5. The bottle nipple size selection system of claim 4, wherein a diameter of said first aperture is larger than a diameter of said second aperture.

6. The bottle nipple size selection system of claim 5, wherein a diameter of said third aperture is smaller than said diameter of said second aperture.

7. The bottle nipple size selection system of claim 1, wherein each of said plurality of apertures is round.

8. The bottle nipple size selection system of claim 4, wherein said first aperture has a diameter of 9.525 mm.

9. The bottle nipple size selection system of claim 8, wherein said second aperture has a diameter of 12.7 mm.

10. The bottle nipple size selection system of claim 9, wherein said third aperture has a diameter of 15.875 mm.

11. The bottle nipple size selection system of claim 1, wherein a diameter of each of said plurality of apertures is offset by 4 mm for each of said apertures.

12. A bottle nipple size selection system, comprising:
a sizing template, wherein said sizing template is comprised of a flat, rectangular member, wherein said sizing template includes a first end and a second end;
a plurality of apertures extending along a length of said sizing template from said first end to said second end, wherein each of said plurality of apertures is comprised of a different diameter; and
a plurality of bottle nipples, wherein each of said plurality of bottle nipples matches a width of one of said plurality of apertures.

13. The bottle nipple size selection system of claim 12, wherein said plurality of apertures is comprised of a first aperture, a second aperture and a third aperture.

14. The bottle nipple size selection system of claim 13, wherein a diameter of said first aperture is larger than a diameter of said second aperture.

15. The bottle nipple size selection system of claim 14, wherein a diameter of said third aperture is smaller than said diameter of said second aperture.

16. The bottle nipple size selection system of claim 12, wherein each of said plurality of apertures is round.

17. The bottle nipple size selection system of claim 12, wherein said first aperture has a diameter of 9.525 mm.

18. The bottle nipple size selection system of claim 17, wherein said second aperture has a diameter of 12.7 mm.

19. The bottle nipple size selection system of claim 18, wherein said third aperture has a diameter of 15.875 mm.

20. A bottle nipple size selection system, comprising:
a sizing template, wherein said sizing template is comprised of a flat, rectangular member, wherein said sizing template includes a first end and a second end;
a plurality of apertures extending along a length of said sizing template from said first end to said second end, wherein each of said plurality of apertures is comprised of a different diameter;
wherein said plurality of apertures is comprised of a first aperture, a second aperture, a third aperture, a fourth aperture, a fifth aperture, a sixth aperture and a seventh aperture, wherein said first aperture has a diameter of 9.525 mm, wherein said second aperture has a diameter of 12.7 mm, wherein said third aperture has a diameter of 15.875 mm, wherein said fourth aperture has a diameter of 19.05 mm, wherein said fifth aperture has a diameter of 25.4 mm, wherein said sixth aperture has a diameter of 31.75 mm, wherein said seventh aperture has a diameter of 38.1 mm; and a plurality of bottle nipples, wherein each of said plurality of bottle nipples matches a width of one of said plurality of apertures.

* * * * *